(12) United States Patent
Tolstaya

(10) Patent No.: US 8,831,382 B2
(45) Date of Patent: Sep. 9, 2014

(54) METHOD OF CREATING A COMPOSITE IMAGE

(75) Inventor: Ekaterina V. Tolstaya, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 615 days.

(21) Appl. No.: 12/708,865

(22) Filed: Feb. 19, 2010

(65) Prior Publication Data

US 2010/0246976 A1 Sep. 30, 2010

(30) Foreign Application Priority Data

Feb. 20, 2009 (RU) ................................ 2009105834

(51) Int. Cl.
*G06K 9/32* (2006.01)
*H04N 1/387* (2006.01)
*G06T 3/40* (2006.01)

(52) U.S. Cl.
CPC ............ *G06T 3/4038* (2013.01); *H04N 1/3876* (2013.01)
USPC ........... 382/294; 382/278; 382/283; 382/296; 382/297; 382/298

(58) Field of Classification Search
USPC .......................... 382/294, 278, 283, 296–298
See application file for complete search history.

(56) References Cited

U.S. PATENT DOCUMENTS

| | | | | |
|---|---|---|---|---|
| 6,714,689 B1 * | 3/2004 | Yano et al. | .................... | 382/284 |
| 7,006,111 B1 | 2/2006 | Rothrock | | |
| 2005/0169555 A1 * | 8/2005 | Hasegawa | ..................... | 382/284 |
| 2006/0187509 A1 * | 8/2006 | Blonde et al. | .................. | 359/23 |
| 2007/0086675 A1 * | 4/2007 | Chinen et al. | ................. | 382/284 |

OTHER PUBLICATIONS

Registration—Panoramas, Xiong et al., XP010315597, IEEE, Oct. 19, 1998, pp. 69-74 (IDS reference).*
Image Mosaicing-blending, Peter Booth, May 6, 2008, pp. 1-66.*
Image alignment—A tutorial, Richard Szeliski, Dec. 10, 2006, pp. 1-89.*
Automatic panoramic stitching using invariant features, Brown et al. Springer, 2007, pp. 59-73.*
European Search Report issued Jul. 6, 2010 on EP Application No. 10154077.1.
Szeliski Richard: "Image Alignment and Stitching: A tutorial" Internet Citation Dec. 10, 2006, pp. I-II, XP002521144 Retrieved from the Internet: UEL:http://pages.cs.wisc.edu/{dyer/ai-qual/szeliski-tr06.pdf [retrieved on Mar. 20, 2009] * pp. 33, 37-38, 48, 56, 62-62 *.
Noah Snavely et al: "Modeling the World from Internet Photo Collections" International Journal of Computer Vision Kluwer Academic Publishers, BO, vol. 80., No. 2, Dec. 11, 2007, pp. 189-210, XP019616619 ISSN: 1573-1405 * p. 194, left hand column, line 4—p. 195, left hand column, line 33; figure 1 *.
Yalin Ziong et al: "Registration, calibration and blending in creating high quality panoramas" Applications of Computer Vision, 1998. WACV '98. Proceedings., Fourth IEEE Workshop on Princeton, NJ, USA Oct. 19-21, 1998, Los Alamitos, CA, USA IEEE Comput. Soc, US, Oct. 19, 1998, pp. 69-74, XP010315597, ISBN: 978-0-8186-8606-1 *figures 4, 5*.

* cited by examiner

*Primary Examiner* — Jayesh A Patel
(74) *Attorney, Agent, or Firm* — Stanzione & Kim, LLP

(57) ABSTRACT

The method of creating image mosaics, comprising performing following operations: component elements of images are analyzed and descriptors of matching points are revealed; pair-wise comparison of descriptors is performed; descriptors are matched with final image and rotation/translation parameters are recovered; component elements one-by-one are complemented in final image, based on recovered rotation/translation parameters.

12 Claims, 7 Drawing Sheets

Table 1

| | 1 | 2 | 3 | 4 | 5 | 6 | 7 |
|---|---|---|---|---|---|---|---|
| 1 | - | 56 | 20 | 5 | 7 | 6 | 2 |
| 2 | 56 | - | 2 | 6 | 34 | 45 | 11 |
| 3 | 20 | 2 | - | 23 | 56 | 23 | 12 |
| 4 | 5 | 6 | 23 | - | 33 | 76 | 4 |
| 5 | 7 | 34 | 56 | 33 | - | 34 | 5 |
| 6 | 6 | 45 | 23 | 76 | 34 | - | 9 |
| 7 | 2 | 11 | 12 | 4 | 5 | 9 | - |

Table 2

| 1 | 2 | 3 | 4 | 5 | 7 |
|---|---|---|---|---|---|
| 6 | 6 | 45 | 23 | 76 | 34 | 9 |

Table 3

| 1 | 2 | 3 | 5 | 7 |
|---|---|---|---|---|
| 6 | 6 | 45 | 23 | 34 | 9 |
| 4 | 5 | 6 | 23 | 33 | 4 |

Table 4

| 1 | 3 | 5 | 7 |
|---|---|---|---|
| 6 | 6 | 23 | 34 | 9 |
| 4 | 5 | 23 | 33 | 4 |
| 2 | 56 | 2 | 34 | 11 |

Table 5

| 3 | 5 | 7 |
|---|---|---|
| 6 | 23 | 34 | 9 |
| 4 | 23 | 33 | 4 |
| 2 | 2 | 34 | 11 |
| 1 | 20 | 7 | 2 |

Table 6

| 3 | 7 |
|---|---|
| 6 | 23 | 9 |
| 4 | 23 | 4 |
| 2 | 2 | 11 |
| 1 | 20 | 2 |
| 5 | 56 | 5 |

Table 7

| 7 |
|---|
| 6 | 9 |
| 4 | 4 |
| 2 | 11 |
| 1 | 2 |
| 5 | 5 |
| 3 | 12 |

FIG. 4

Table 1

|   | 1 | 2 | 3 | 4 | 5 | 6 | 7 |
|---|---|---|---|---|---|---|---|
| 1 | - | 56 | 20 | 5 | 7 | 6 | 2 |
| 2 | 56 | - | 2 | 6 | 34 | 45 | 11 |
| 3 | 20 | 2 | - | 23 | 56 | 23 | 12 |
| 4 | 5 | 6 | 23 | - | 33 | 76 | 4 |
| 5 | 7 | 34 | 56 | 33 | - | 34 | 5 |
| 6 | 6 | 45 | 23 | 76 | 34 | - | 9 |
| 7 | 2 | 11 | 12 | 4 | 5 | 9 | - |

Table 2

|   | 1 | 2 | 3 | 4 | 5 | 7 |
|---|---|---|---|---|---|---|
| 6 | 6 | 45 | 23 | 76 | 34 | 9 |

Table 3

|   | 1 | 2 | 3 | 5 | 7 |
|---|---|---|---|---|---|
| 6 | 6 | 45 | 23 | 34 | 9 |
| 4 | 5 | 6 | 23 | 33 | 4 |

Table 4

|   | 1 | 3 | 5 | 7 |
|---|---|---|---|---|
| 6 | 6 | 23 | 34 | 9 |
| 4 | 5 | 23 | 33 | 4 |
| 2 | 56 | 2 | 34 | 11 |

Table 5

|   | 3 | 5 | 7 |
|---|---|---|---|
| 6 | 23 | 34 | 9 |
| 4 | 23 | 33 | 4 |
| 2 | 2 | 34 | 11 |
| 1 | 20 | 7 | 2 |

Table 6

|   | 3 | 7 |
|---|---|---|
| 6 | 23 | 9 |
| 4 | 23 | 4 |
| 2 | 2 | 11 |
| 1 | 20 | 2 |
| 5 | 56 | 5 |

Table 7

|   | 7 |
|---|---|
| 6 | 9 |
| 4 | 4 |
| 2 | 11 |
| 1 | 2 |
| 5 | 5 |
| 3 | 12 |

METHOD OF CREATING A COMPOSITE IMAGE

CROSS-REFERENCE TO RELATED APPLICATIONS

This application claims the benefit of Russian Application No. 2009105834, filed Feb. 20, 2009, in the Russian Intellectual Property Office, the disclosure of which is incorporated herein by reference.

BACKGROUND

1. Field of the Invention

Claimed invention relates to processing of digital images, more concrete, to methods of creating a composite (mosaic) image from several partially overlapping images, captured by a flat-bed device such as a scanner or multi-functional peripheral (MFP).

2. Description of the Related Art

In general, a mosaic image is realized as an image, composed from large number of frames, partly overlapping and stitching together for receiving of single canvas. As a result, the mosaic image is typically larger than the maximum size of image, which could be scanned in one frame using of user's flat-bed device.

A number of technical decisions are known to generate such mosaic images. Early methods generally required a user input to determine overlap between images. However, more recent stitching methods can provide an automated aligning of images that cover random 2D field with images taken in an arbitrary order. In either case, as is well known to specialists, such systems use a set of images, captured by flatbed device and perform postprocessing such images, including, for example, aligning, compositing, blending of overlapped areas to generate a mosaic image which is then optionally cropped to a frame to create the final image mosaic.

From prior art the various methods for image generation, in which process of aligning is based on feature points matching. Among them there are methods based on cross-correlation of areas with the similar brightness. These methods are not invariant to scale and rotation of initial (input) images. Besides it was proposed to use various types of invariants, for example, Hu's and Flusser invariants (see J. Flusser and B. Zitová, "Combined invariants to linear filtering and rotation," Intl. J. Pattern Recognition Art. Intell., Vol. 13, pp. 1123-1136, 1999) [1]. However, the most reliable method based on invariant features is Lowe's method (see Lowe, David G. (1999.) "Object recognition from local scale-invariant features". Proceedings of the International Conference on Computer Vision 2: 1150-1157 [2]). Transforms, described in the given method, are geometrically invariant both in case of similarity transforms and affine transforms in brightness.

Invention, described in U.S. Pat. No. 6,097,418 [3], eliminates artifacts in an image formed using a plurality of initial elements. Visible seams in the image are eliminated by randomizing the stitch point between the scan lines produced by each imaging source. The randomization may be optimized by applying a method for relocating the random stitch point based on the data content of the scan line, adjacent scan lines, and other criteria. In the present invention the problem is also solved of compensation for scan errors caused by thermal factors, desynchronization of barrel, mechanical misalignment, and other factors associated with the use of a plurality of systems of creating of images. A photodetector system, comprising a mask having a pair of triangular openings, provides measurements of the errors inside the scanner.

In U.S. Pat. No. 7,271,822 [4] systems and methods are described for stitching multiple images together in a printer to form a single, seamless, composite image. The use of multiple laser sources and multiple scan lenses with one or more scanner devices and various image stitching methods allows achieving the much better quality of composite image, that at use of printers with single laser source and single scan lenses. Such benefits include, for example, a wider image format, smaller granularity, reduced cost, and reduced overall size for the printer.

In U.S. Pat. No. 7,006,111 [5] it is proposed to identify cases, when at least two digital images overlap at a first resolution level. At that it is achieved, that overlapping areas of the at least two digital images at a second resolution level higher than the first resolution level are obtained. At that the overlapping areas are identified at the second resolution level.

In U.S. Pat. Nos. 6,754,379 [6] and 6,359,617 [7] and in report Y. Xiong and K. Turkowski. "Registration, Calibration, and Blending in Creating High Quality Panoramas". 4th IEEE Workshop on Applications of Computer Vision. Oct., 1998 [8] a method for aligning rectilinear images in 3D through projective record and calibration is offered. First, images are registered by projective method using gradient-based optimization and a correlation-based linear search. On the second step internal and external parameters of every image are calibrated using global optimization. This considerable minimizes overall image discrepancies in all overlap regions. On the third step images are blended using Laplacian-pyramid based method using blend mask generated by distance transform. Thus, smooth transition between images is provided and small residues of misalignment, resulting from parallax or imperfect pair-wise matching, are eliminated.

In spite of the fact that various program methods of creating of the mosaic image have been offered, nevertheless, a number of drawbacks could not get over by these methods. Among such drawbacks it is necessary to note incorrect blending of images and small speed of matching and blending of images for creating of the mosaic image.

SUMMARY

Technical result is achieved due to application of new approach to creating of mosaic images, comprising performing following operations:

input images are analyzed, matching points are revealed, being the special points, and descriptors of points of matching are determined;

pair-wise comparison of input images is performed by matching of special points;

reference image is chosen;

the most suitable, by quantity of matching descriptors with descriptors of reference image, image is chosen one-by-one and parameters of rotation/translation of the given image are recovered relatively to reference image, after that reference image is complemented by points and descriptors of the given image;

images are complemented one-by-one in reference image, using recovered rotation/translation parameters so, that the seam between the jointed images is visible as less as possible.

Claimed method is applicable to color and grayscale images. Using this method it is possible to stitch parts of scanned document, independently of images input order and their orientations. Final image quality is improved by usage of optimal seam computation and seamless image blending. Resulting image is suitable for input in systems of optical recognition of signs.

Feature of claimed invention is that this solution proposes fast matching algorithm and rotation/translation (shifting) parameters estimation, which does not require user intervention, in addition it provides blending of images with arbitrary image placement on the reference image and optimal seam computation which passes trough sector of difference between overlapping pixels along a minimal cost path.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 4. Exemplary tables for clarification of the process of selection of the next image to blend.

DETAILED DESCRIPTION OF THE EMBODIMENTS

Figure 1:
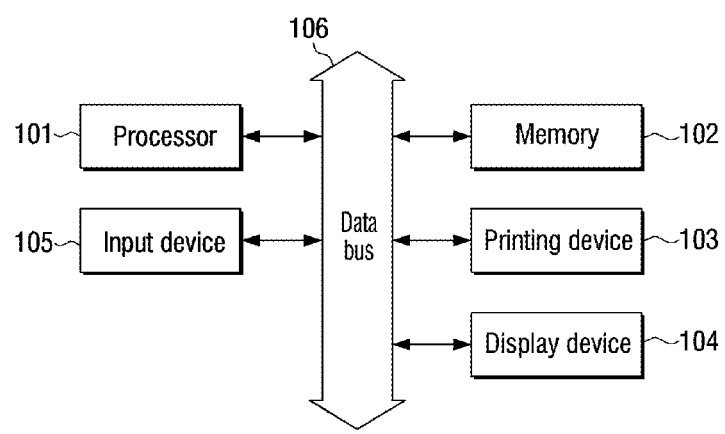
FIG. 1. Scheme of basic components of the system.

FIG. 1 shows a scheme of basic components of the system which realizes claimed method. The operation process of the device is controlled by a processor 101 which executes the program code being stored in memory 102. In memory 102 source grayscale or color photo are stored. The image is processed and transferred to the display device 104. An information exchange is carried out through the data bus 106.

Figure 2:
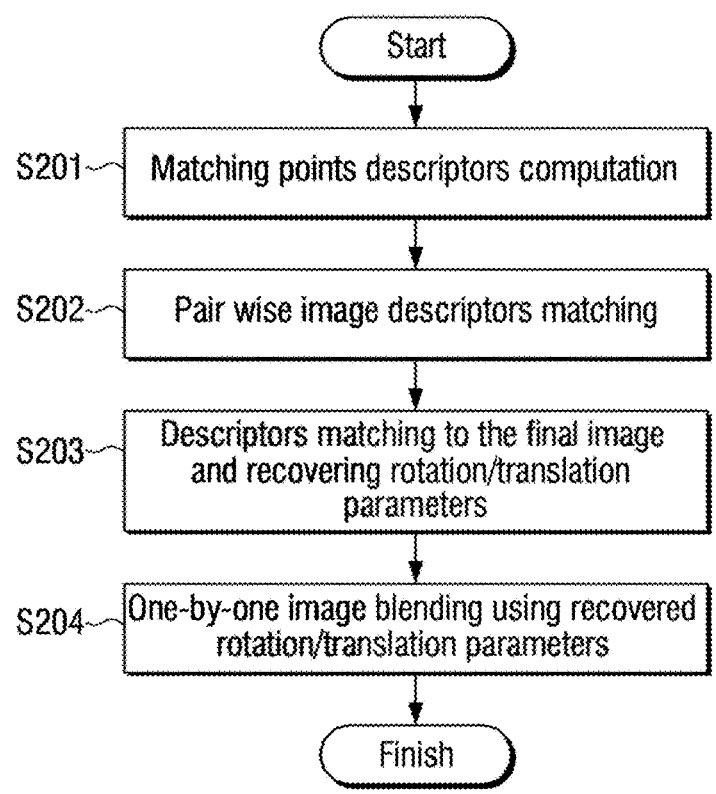
FIG. 2. Basic steps for creating image mosaics.

FIG. 2 illustrates process of creating a mosaic from a set of partially overlapping images. On step 201, images are analyzed, resampled to predetermined size, and feature points, i.e. matching points, are found. For every matching point a descriptor is computed. This can be done by various methods described in literature. For example, using Scale-Invariant Feature Transform (SIFT) (see [2]). Then, on step 202, feature points are matched for every pair of images from the source (input) set. Number of correctly matched points is stored in a table. On step 203, feature points of every image are matched to the final image (details on this step are described below), at that resulting affine models of image transformation (rotation/translation parameters) are stored in memory. After that, images one-by-one are blended to the final image (details of this step are below). It is final step of claimed method.

On step 202, feature points are matched in every pair of images from the source (input) set. Measure of closeness between two matching pairs is sum of square differences of corresponding descriptors' components. A square matrix with all possible descriptor pairs differences is constructed. For every line a minimum value is found and marked. For every column minimum value is found and marked. Pairs, where such marks coincide, are considered as matching pairs. Then rotation/translation parameters between pairs, i.e. those points, which do not satisfy to the found rotation/translation parameters, are recovered and outliers are eliminated by application of RANdom Sample Consensus (RANSAC) method.

RANSAC is an algorithm to estimate parameters of a mathematical model from a set of observed data which contains outliers. RANSAC iteratively selects a random subset of the original data points. A model is adapted to these points, which are the hypothetical "adequate points" (inliers), to produce so-called "predicted" data. This "predicted" data is then compared to "measured" data. If the point fits well, it is considered as a hypothetical "adequate point" (inlier). If sufficiently many points have been classified as hypothetical inliers relative to the estimated model, then this model is reasonably good. This procedure is then repeated a fixed number of times, each time producing either a model which is rejected because too few points are classified as inliers or receiving a refined model together with a corresponding data (weight) of error. In the latter case, the refined model is kept, if its error is lower than the last saved model.

Figure 3:
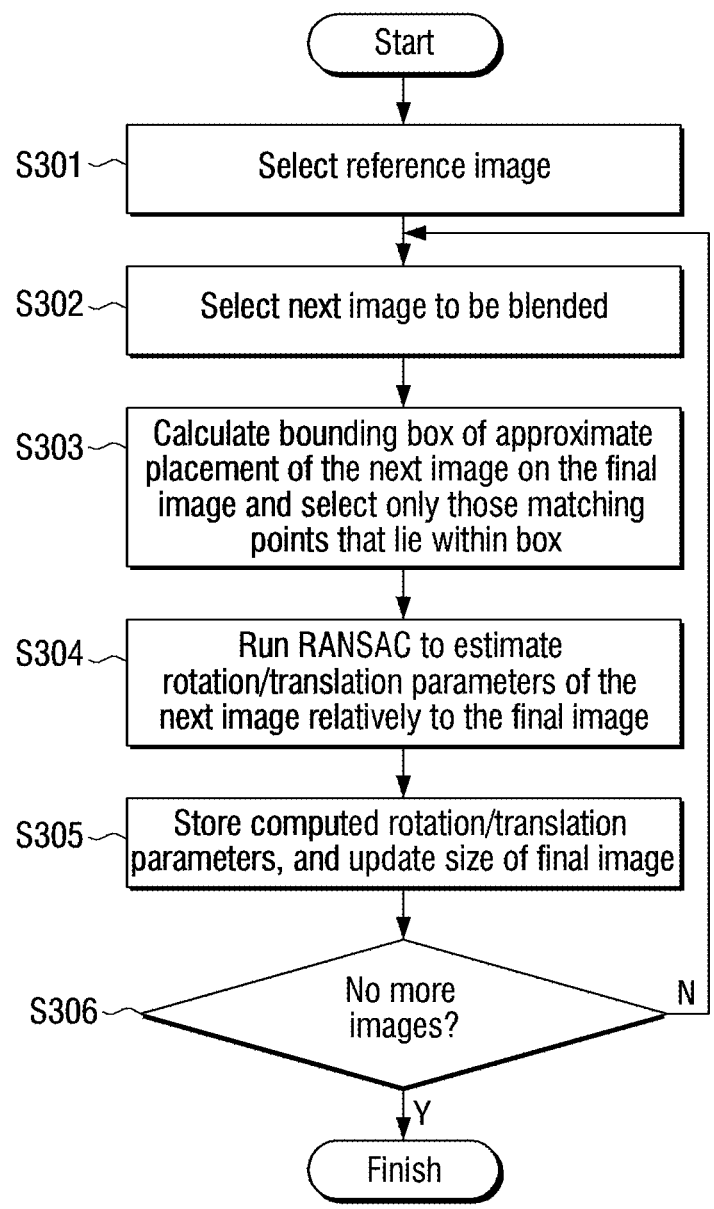
FIG. 3. Illustration of the process of descriptors matching to the final image and recovering rotation/translation parameters (step 203).

FIG. 3 illustrates step 203, where descriptors are matched to the final image. On the step 301, first (reference) image is selected (details of this choice are below), which is copied in input image intact. Then the following procedure is performed, until there are no more unprocessed images. Next image to blend is selected (step 302). Process of selecting the next image is illustrated below. On step 303, a bounding rectangle of approximate placement of the next image on the final image is calculated. Then, only those points are selected that lie within computed bounding rectangle to improve matching accuracy. On step 304, RANSAC method is employed to compute rotation/translation parameters of the next image relatively to the output (final) image. On step 305 rotation/translation parameters are stored in memory. Size of final image is corrected to be equal to the bounding rectangle of final image and just matched image. Feature points of output image are added with feature points of just blended image, to which found model of rotation/translation are preliminary applied. If there is no more unprocessed images (condition 306) method finishes.

FIG. 4 illustrates iterative selection process of the next image to blend. On the given example number of source (input) images is 7. 7×7 table is formed during image pairwise comparison (Table 1). This table is symmetrical; at that numbers, specified in it, represent number of matching points between images of points. First row and first column contain input image indexes. First (reference) image is selected (step 301) by summing numbers in the table rows and selecting row with maximal sum. This image is copied to the final image intact. Then next image is selected (step 303). For this purpose a table with numbers, reflected blended/not blended image matching points numbers, is formed (for illustration see tables 2, 3, 4, 5, 6, 7). First row (column) in such tables has input indexes of unblended images. First column in such tables has input indexes of already blended images. The maximal number is selected in the table and next image index is set to be equal to the column number, where the maximum value is founded. For illustration purposes 4 of such tables are presented, and image, where blending order is 6, 4, 2, 1, 5, 3.

Figure 5:
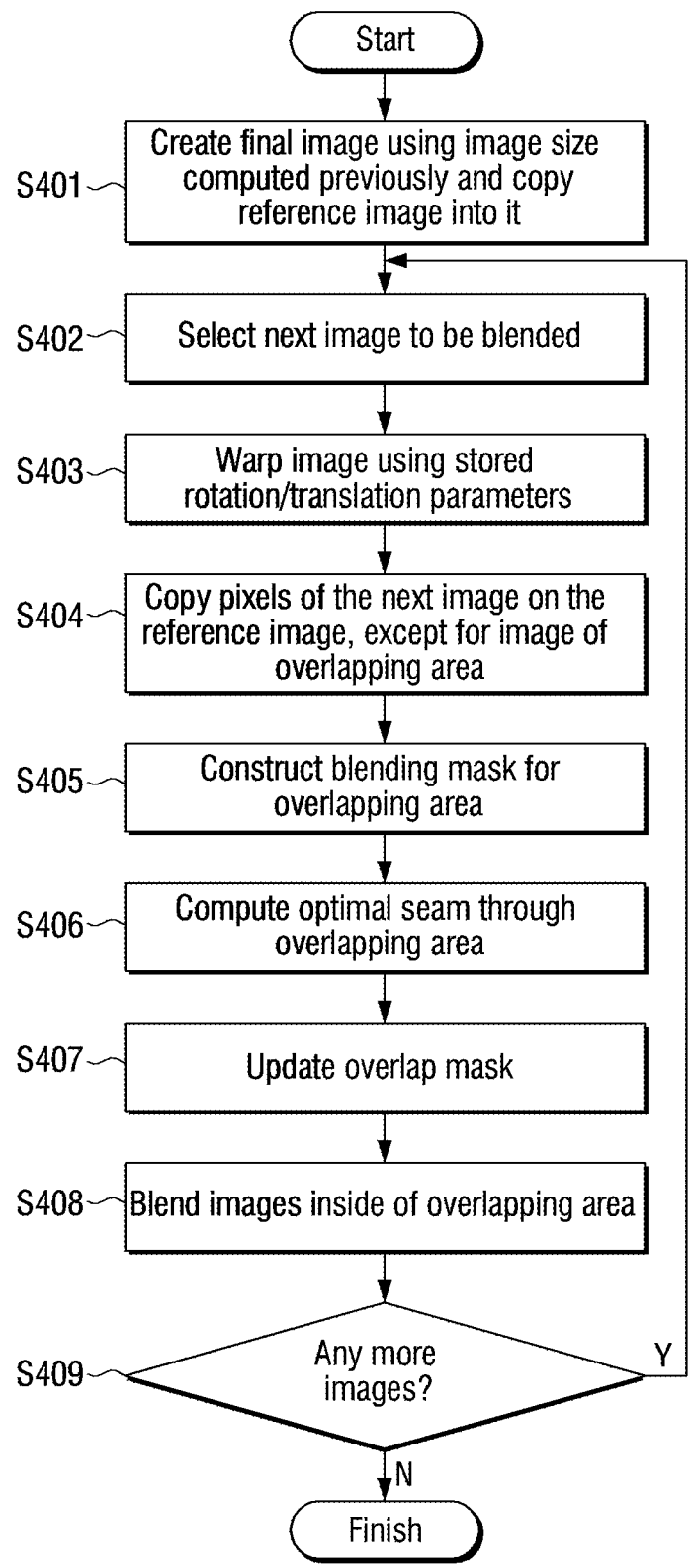
FIG. 5. Illustration of the process of one-by-one image blending using recovered rotation/translation parameters (step 204).

FIG. 5 illustrates step 204, where images are blended to the reference image using affine models. First, final image is created, using image size computed previously, and reference image is copied into it intact. On step 402 next image is selected the same way as in step 302. Selected image is warped using rotation/translation parameters saved on step 305. Then coordinates of overlapping area are computed. Pixels, which do not belong to overlapping area, are copied to the output (final) image (step 404). On step 405, a blending mask is constructed. Blending mask is an image, consisting of three colors (shades): black, gray and white. Black color corresponds to the output (final) image pixels, white color corresponds to next blended image, and gray color corresponds to the pixels, yet undecided. (for illustration see panel 5 in FIG. 6A) Area N pixels wide near overlap mask edges has black or white color, depending on the edges of image that correspond to edges of overlap mask: if edges of output (final) image coincide with edges of overlap mask, then color is black; if edges of next blended image coincide with edges of overlap mask, then color is white. In the areas, where overlap mask is gray, optimal seam is computed (step 406): a path through array of pixels differences that gives the minimal cost.

Figure 6A:
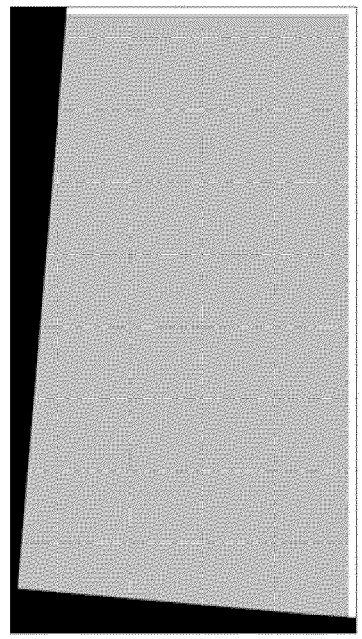
FIG. 6A illustrates a blending mask, constructed on step 405.
Figure 6B:
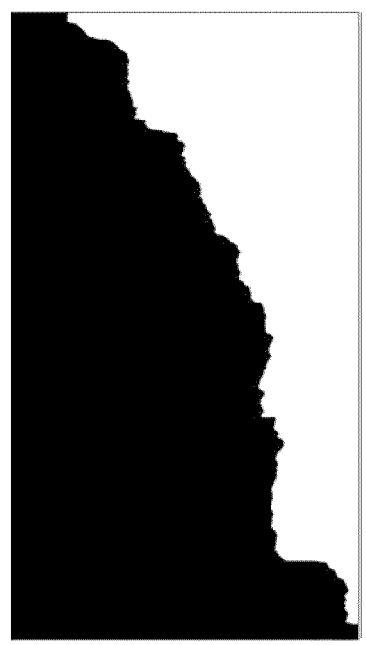
FIG. 6B illustrates an updated blending mask, computed on step 407.
Figure 6C:
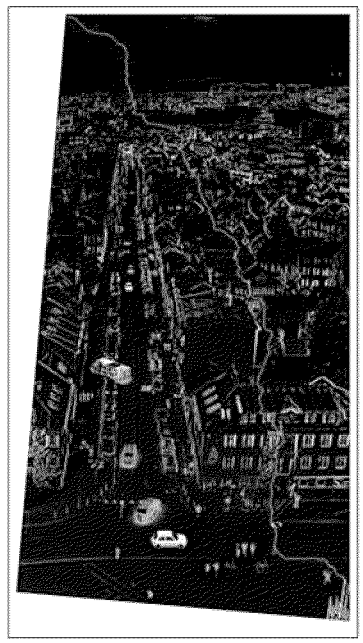
FIG. 6C illustrates an image of pixel differences inside an overlapping area with an optimal seam (marked with light curve line).

FIG.6A illustrates a possible variant of an overlap optimal seam (marked by light curve line). After that, the blending mask is updated (step 407): on one side of the overlap optimal seam, the mask is colored with white color; on the other side, it is colored with black color. After this procedure, the overlap mask has only two colors: black and white. This is shown in FIG. 6B,). On step 408 images are blended inside an overlapping area, by one of the methods known from the state of art. The described procedure is carried out for all images except the reference image. On the step 409, a condition is verified, of whether there are any unprocessed images. In case the condition is positive, the procedure is repeated; otherwise, the method finishes.

Principles, which lie in the basis of claimed invention, are explained by graphic materials and descriptions of preferred embodiments of the invention. It should be clear for specialists that various embodiments of claimed invention are possible and that the particular elements of claimed invention can be modified without departing from the inventive concept. Thus, the drawings and description are to be considered as illustrative in nature and not restrictive.

The claimed method is intended for realization in software for flatbed scanners, slide scanners, MFP or other like devices.

While there have been illustrated and described what are considered to be exemplary embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, more than one image area may be selected, enlarged, and added to the captured image, or the selected image area may not be enlarged. Furthermore, multiple keywords may be applied to one icon. Accordingly, it is intended, therefore, that the present invention not be limited to the various exemplary embodiments disclosed, but that the present invention includes all embodiments falling within the scope of the appended claims.

What is claimed is:

1. A method of creating image mosaics, comprising:
analyzing input images, revealing matching points, the matching points being special points, and determining descriptors for the respective matching points;
performing pair-wise comparison of the input images by matching of the special points;
choosing a reference image from the input images;
choosing remaining input images after choosing the reference image one-by-one in a predetermined order, the predetermined order being determined by computing a quantity of matching descriptors of each of the remaining input images with descriptors of the reference image and analyzing the computed quantity of matching descriptors of each of the remaining input images with descriptors of the reference image, and recovering parameters of rotation/translation of each of the remaining input images relatively to the reference image, after the reference image is compared by points and descriptors of the remaining input images; and
compositing the remaining input images one-by-one with the reference image in the predetermined order, using the recovered rotation/translation parameters so that a seam between the composited remaining input images and the reference image is visible as little as possible,
wherein in the course of pair-wise matching of special points a square-symmetric table is formed consisting of quantity of compatible points for each pair of images.

2. The method as in claim 1, wherein in the process of analyzing the input images, a copy of the input images with lower resolution is calculated and these copies are used for quicker calculation of descriptors.

3. The method as in claim 1, wherein descriptors for the respective matching points are invariant to scale and rotation.

4. The method as in claim 1, wherein a mask of matching is created and processed.

5. The method as in claim 1, wherein in a course of by-turn matching the input images to the image mosaics on non-overlapping areas of a current matched input image and the image mosaics, an optimum seam is determined, which passes through pixels located on overlapped areas and having minimal distinctions.

6. A method of creating image mosaics, comprising:
analyzing input images, revealing matching points, the matching points being special points, and determining descriptors for the respective matching points;
performing pair-wise comparison of the input images by matching of the special points;
choosing a reference image from the input images;
choosing remaining input images after choosing the reference image one-by-one in a predetermined order, the predetermined order being determined by a quantity of matching descriptors of each of the remaining input images with descriptors of the reference image, and recovering parameters of rotation/translation of each of the remaining input images relatively to the reference image, after the reference image is compared by points and descriptors of the remaining input images; and
compositing the remaining input images one-by-one with the reference image in the predetermined order, using the recovered rotation/translation parameters so that a seam between the composited remaining input images and the reference image is visible as little as possible,
wherein rotation/translation parameters for each of the input images are recovered for each of the input images by matching of the special points with a frame of a final image in the predetermined order.

7. The method as in claim 6, wherein the predetermined order of choosing of images is determined using a table with results of pair-wise matching.

8. A method of creating a composite image, comprising:
analyzing input images to determine matching points and computing descriptors for the respective matching points;
selecting a reference image from the input images;
selecting remaining images of the input images after selecting the reference image one-by-one in a predetermined order that is determined by computing a quantity of matching points between the input images and analyzing the computed quantity of the matching points between the input images, and estimating rotation/translation parameters of the remaining input images in the predetermined order; and compositing the remaining input images with the reference image one-by-one in the predetermined order to create a final image, wherein the selecting the reference image comprises:

creating a table of matching points between the input images that has a size of N×N, N representing a number of the input images, a first row and a first column of the table including input image indexes; and selecting the reference image by summing numbers in rows of the N×N table and selecting an input image index in a row with a maximal sum.

9. The method of claim 8, wherein the estimating of the rotation/translation parameters is performed using a RANdom Sample Consensus (RANSAC) method.

10. A method of creating a composite image, comprising:

analyzing input images to determine matching points and computing descriptors for the respective matching points;

selecting a reference image from the input images;

selecting remaining images of the input images after selecting the reference image one-by-one in a predetermined order that is determined by analyzing a quantity of matching points between the input images, and estimating rotation/translation parameters of the remaining input images in the predetermined order; and compositing the remaining input images with the reference image one-by-one in the predetermined order to create a final image, wherein the predetermined order is determined by creating the plurality of tables with a first row having input image indexes of unblended images and a first column having input image indexes of blended images, and selecting a maximal number in each of the plurality of tables and its corresponding image index number.

11. A method of creating a composite image, comprising:

analyzing input images to determine matching points and computing descriptors for the respective matching points;

selecting a reference image from the input images;

selecting remaining images of the input images after selecting the reference image one-by-one in a predetermined order that is determined by analyzing a quantity of matching points between the input images, and estimating rotation/translation parameters of the remaining input images in the predetermined order; and compositing the remaining input images with the reference image one-by-one in the predetermined order to create a final image, wherein the compositing the remaining input images in the reference image comprises:

warping each of the remaining input images using its respective rotation/translation parameter;

constructing a blending mask for an overlapping area between each of the remaining input images and the reference image;

computing an optimal seam through the overlapping area;

updating the blending mask based on the optimal seam; and blending each of the remaining input images and the reference image inside of the overlapping area.

12. The method of claim 11, wherein the blending mask is an image including black, gray, and white colors, the black color corresponding to final image pixels, the white color corresponding to a next blended image, and the gray color corresponding to pixels that are not yet decided.

* * * * *

UNITED STATES PATENT AND TRADEMARK OFFICE
CERTIFICATE OF CORRECTION

PATENT NO. : 8,831,382 B2  
APPLICATION NO. : 12/708865  
DATED : September 9, 2014  
INVENTOR(S) : Ekaterina V. Tolstaya Page 1 of 1

It is certified that error appears in the above-identified patent and that said Letters Patent is hereby corrected as shown below:

On the Title Page

Column 2, Item [56] (Other Publications), line 13, delete "UEL" and insert -- URL --, therefor.

Signed and Sealed this  
Fourth Day of August, 2015

Michelle K. Lee  
*Director of the United States Patent and Trademark Office*